United States Patent [19]

Hentschel et al.

[11] Patent Number: 4,625,105

[45] Date of Patent: Nov. 25, 1986

[54] ELECTRO-OPTIC CIRCUIT WITH SOURCE CONTROL FEEDBACK

[75] Inventors: Christian Hentschel, Holzgerlingen; Wolfgang Schmid, Stuttgart, both of Fed. Rep. of Germany

[73] Assignee: Hewlett-Packard GmbH, Fed. Rep. of Germany

[21] Appl. No.: 607,683

[22] Filed: May 7, 1984

[30] Foreign Application Priority Data

May 10, 1983 [DE] Fed. Rep. of Germany ....... 3317027

[51] Int. Cl.⁴ ................................................. G01J 1/32
[52] U.S. Cl. ...................................... 250/205; 455/618
[58] Field of Search ............ 250/205, 213 R, 214 AG, 250/214 C; 315/149; 330/59, 149; 455/613, 618

[56] References Cited

U.S. PATENT DOCUMENTS

| | | | |
|---|---|---|---|
| 4,056,719 | 11/1977 | Waaben | 250/205 |
| 4,075,474 | 2/1978 | Strauss et al. | 250/205 |
| 4,211,929 | 7/1980 | Tamburelli | 250/205 |

Primary Examiner—David C. Nelms
Attorney, Agent, or Firm—Edward Y. Wong

[57] ABSTRACT

A circuit for the conversion of an electrical input signal into an optical output signal is disclosed. A portion of the main beam from a laser diode that provides the optical output is reflected to a PIN diode with a glass pane. Linearization of the electro-optical conversion process over a wide frequency range is achieved through a feedback loop. For operation at frequencies higher than that of the feedback loop bandwidth, the various conversion factors for low and high frequencies can be additionally adapted.

11 Claims, 3 Drawing Figures

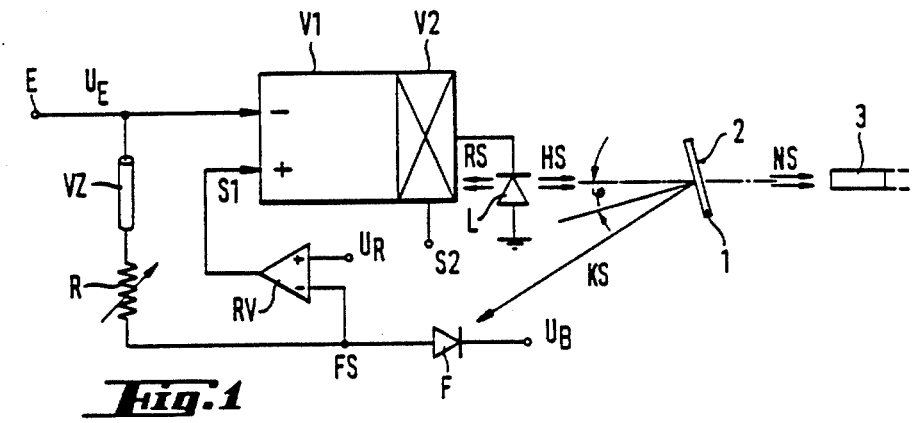
_Fig. 1_
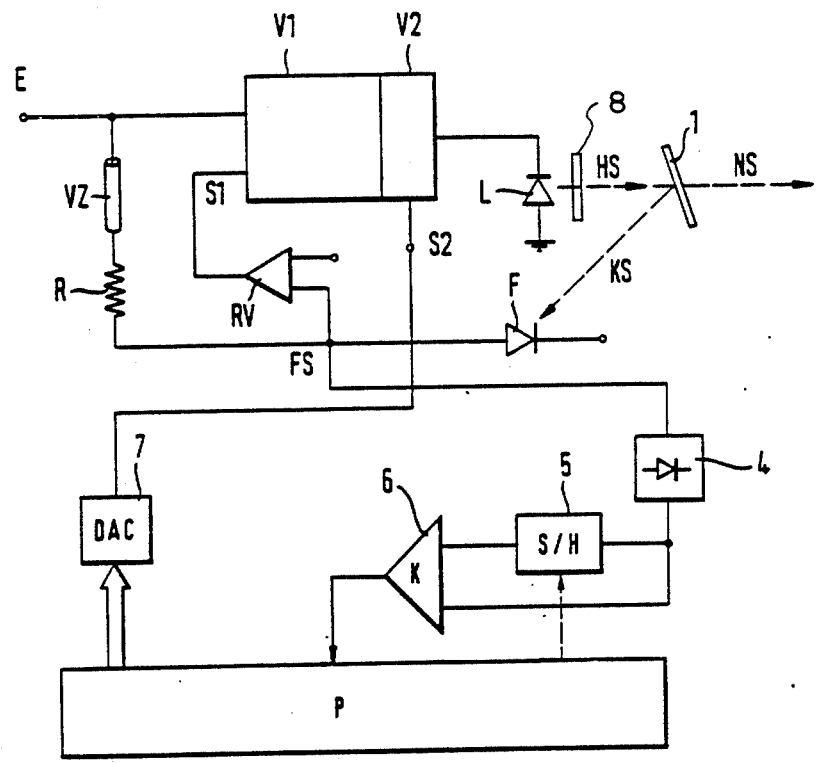
_Fig. 2_

ELECTRO-OPTIC CIRCUIT WITH SOURCE CONTROL FEEDBACK

BACKGROUND AND SUMMARY OF THE INVENTION

Amplifier circuits for converting electrical signals into corresponding light signals by applying high-frequency electrical signals to a laser diode are known. For message transmission over long distances, a laser beam can be fed into an optical fiber. In order that the quality of transmission be impaired as little as possible by the conversion of electrical signals into optical ones, errors or distortions occurring during conversion should preferably be kept at a minimum. One way to minimize distortions is to ensure linearity in the conversion.

Circuits for linearizing electro-optical conversions are known. In these circuits a back facet laser signal is converted into a corresponding electrical signal. The corresponding electrical signal is then applied to an input of a differential amplifier; the other input of the differential amplifier is supplied with the nominal value of the electrical signal to be converted. At the output of the differential amplifier a differential signal representing the error in the conversion is obtained and is used to control the amplification of the electrical signal to be converted. These known circuits have a particular disadvantage: the feedback loop is supplied by a back facet laser signal which may deviate greatly from the signal of the main beam. This deviation in turn causes a distortion in the conversion.

An object of the present invention therefore is to develop a circuit for converting an electrical input signal into an optical output signal largely without distortion over a preferably wide frequency range. One approach in achieving this object is set forth in claim 1. Therein, a control beam is decoupled from a main beam generated by a light-producing element like a laser diode and is detected with a light-detecting element like a photodiode. The control beam is decoupled by means of a reflection with a transparent mirror or a glass pane. The intensity of the control beam lies within a few percent of the intensity of the main beam, for example, 4%. In this instance then, 96% of the main beam penetrates the mirror or glass pane and is available as a signal beam. A detector photodiode in response to the detected control beam produces an electrical "real" signal. The electrical real signal is coupled, through linear elements only, with a "nominal" signal having the nominal value of the signal to be converted to produce an error signal. The error signal is superimposed on the electrical signal to be converted at the input of a converter containing an error amplifier.

Preferably the input port of the converter is connected to the anode of the photodiode via a delay line and an ohmic resistor in series therewith; the cathode of the photodiode is connected to a positive direct current (d.c.) voltage source. The error signal is obtained at the node between the photodiode and the ohmic resistor.

In a converter capable of adjusting the optical output signal, the electrical input signal is applied to the inverted input port of a differential amplifier functioning as a controllable amplifier. Preferably, the amplifier is a wideband d.c. amplifier. The non-inverted input port serves as a control input and is connected to the output port of an error amplifier. The error amplifier, which corrects the laser control current, generates a corresponding control signal at its output in response to an error signal. The error amplifier may have a bandwidth considerably lower than that of the controllable amplifier. Thus, at frequencies outside the bandwidth of the error amplifier, the converter system operates in a non-controlled, direct manner where only an average value of the the error signals is monitored and used. Specifically, a d.c. voltage is supplied to the control input port of the controllable amplifier, e.g., at the non-inverted input port, and the electrical input signal is applied to the inverted input port. The amplifier bandwidth of the controllable amplifier, which is connected in series with the laser diode, is not affected by the feedback loop.

A particularly advantageous embodiment of the invention includes a controllable amplifier having a gain control device with an adjustable gain for its output. This control device can be, for example, a multiplier circuit that is part of the d.c. amplifier. The gain of the control device is regulated such that the varying conversion factors at high and low frequencies are compensated for one another. In this manner the electrical input signal is converted into an optical output signal with a substantially constant conversion factor over the entire frequency range.

The circuit in accordance with the preferred embodiment has the added advantage of a wide bandwidth at a stable operating point and high linearity at low and medium frequencies. Regulation of the gain control device is preferably achieved by means of a microprocessor. For this purpose, a test signal is applied to the input port of the circuit and a calibration error signal resulting-therefor therefrom is coupled to a microprocessor, where the calibration error signal is evaluated. The microprocessor then adjusts the gain of the gain control device according to a preceding error signal. This adjustment of the amplification is repeated for several sequential steps until the desired minimization of the error signal is reached. This error minimization is accomplished with the use of a microprocessor with known methods of interval nesting.

For decoupling the control beam, a reflective medium like a thin glass pane is placed in the beam path of the main beam. The glass pane should be oriented in such a way that the angle of beam incidence is close to vertical incidence; in any case, the angle should be less than 45 degrees. In order to avoid interferences, the side of the glass pane distal to the laser diode may be made nonreflecting. Also to avoid interferences, the opposing sides of the glass pane can be nonparallel.

It is known that the reflection on a glass pane or a mirror is dependent on the polarization of the incoming light beam. For a beam with varying polarization directions, such as a beam resulting from varying modulations of a laser diode, correspondingly varying reflection coefficients are engendered. This generally results in a disruptive nonlinear relationship between main beam and control beam. For small angles of incidence, however, deviations of the reflection coefficients are relatively small and therefore do not need to be considered in many applications. However, it is possible to provide a polarization filter between the laser diode and the reflecting glass pane in order to further avoid the disruptive effect mentioned.

BRIEF DESCRIPTION OF THE DRAWINGS

FIG. 1 shows a block diagram of the circuit in accordance with the preferred embodiment of the invention.

FIG. 2 shows a a block diagram of the circuit in accordance with another preferred embodiment of the invention having a microprocessor for adjustment of the conversion factor.

DETAILED DESCRIPTION OF THE INVENTION

Figure 3:
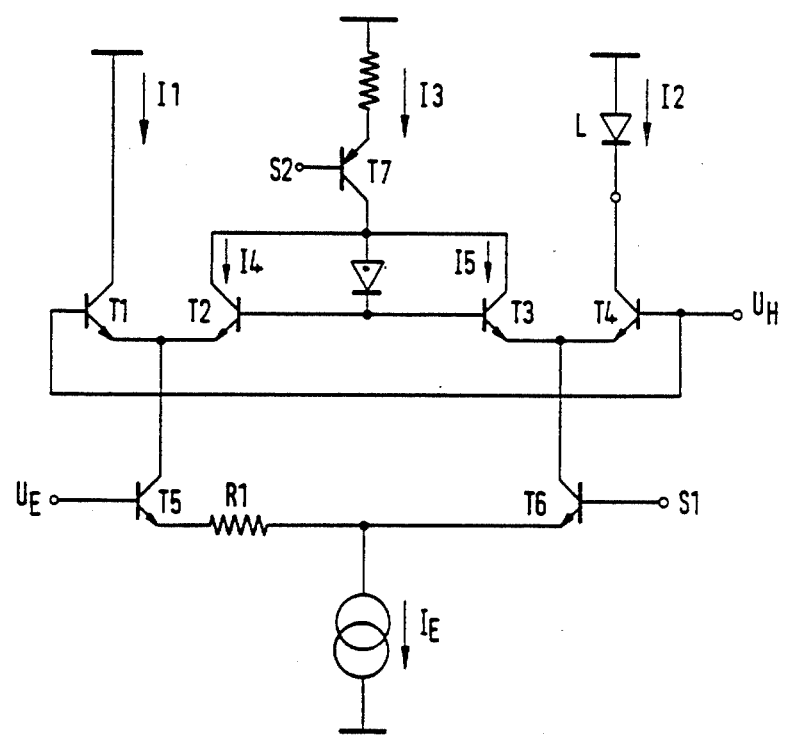
FIG. 3 shows an exemplary embodiment of a controllable amplifier with a gain control device.

The preferred embodiment of the invention depicted in FIG. 1 converts an electrical input signal $U_E$ into an optical output signal HS and comprises a wideband differential amplifier V1, followed by a gain control device V2. The amplifier V1 is a d.c. amplifier and the gain control device V2 is a multiplier element. The input signal $U_E$ to be converted is applied to the inverted input port of the amplifier V1, whose non-inverted input port serves as a control input port S1. The output of the gain control device V2 is coupled to a laser diode L whose anode is grounded. The laser diode L converts the received electrical signal into an optical signal HS which exits as main beam. The reverse beam RS exiting at the rear laser mirror is not used for linearization in the electro-optical conversion.

A small portion of the main beam HS is reflected as control beam KS at an angled glass pane 1 and is applied to a photodiode detector F. The major portion of the main beam HS exits as a signal beam NS at the rear side 2 of the glass pane 1.

The photodiode F is biased in the blocking direction by a positive voltage $U_B$. The anode of the photodiode F is connected to the input port E of the circuit via an adjustable ohmic resistor R and a delay line VZ in series therewith. The anode is further connected to an inverted input of a error amplifier RV whose output is connected to the control input port S1. At the non-inverted input port of the error amplifier RV a reference voltage $U_R$ is applied.

At the node connection between the resistor R and the photodiode F an error signal FS occurs. This error signal is applied to the error amplifier RV, for example, an operational amplifier. The error amplifier RV and the differential amplifier V1 together form a part of a feedback loop to cause the laser main beam HS to be linear with the input signal $U_E$. This feedback loop is constantly active. The operating point of the laser diode can be adjusted with the reference voltage $U_R$.

The photodiode F is preferably a PIN diode and the electrical signal it generates is added with the input signal $U_E$ via the resistor R. The error signal FS can therefore also be called a summation signal; ideally this signal would be identical to the d.c. voltage $U_R$. The feedback linearizes the laser parameters within the bandwidth and stabilizes the laser diode against temperature and aging changes.

In the feedback loop the components, e.g., resistor R and PIN diode F, are made extremely linear in order to achieve high linearity within the bandwidth of the feedback loop. And in order to achieve an optimal transient behavior in the control loop, the input signal $U_E$ is delayed by a delay line VZ impedance-matched at both ends such that it results in phase equality with the photodiode F.

At frequencies outside the bandwidth of the control loop, the amplifier V2 functions in a nonregulated, direct operation. Specifically only the average value of the output signal HS is monitored, which results in a d.c. voltage at the control input port S1.

For the adaptation of the varying conversion factors for high and low frequencies, a gain control device V2 is connected to the amplifier V1. The gain of the gain control device V2 can be adjusted via a control signal to a control input port S2. Typically, the gain control device V2 is an analog multiplier element which may be part of the amplifier V1. FIG. 2 shows an exemplary embodiment of the amplifier V1 with an integrated gain control device V2.

For adjusting the direct conversion factor, a test signal is applied to the input port E for calibration, and the wideband gain at the control input port S2 is adjusted for a minimized calibration error signal. In the preferred embodiment, the adjustment of the wideband gain is achieved through a microprocessor P as depicted in FIG. 2. Also shown in FIG. 2 is a polarization filter 8 interposed between the laser diode L and the glass pane 1. The polarization plane of the filter 8 is parallel to the direction of the main vibration of the laser diode L.

In order to ensure a substantially linear relation between the main beam HS and the control beam KS over the entire frequency range of interest, the angle of incidence of the main beam on the glass pane 1 should preferably be small. Due to the housing dimensions of the laser diode L and the PIN diode F, this angle cannot be arbitrarily small, since an unduly small angle would result in an excessive distance between the laser diode L and the glass pane 1. Tests have shown that an angle of incidence of approximately 8 degrees results in a sufficiently linear relation between the main beam HS and the control beam KS resulting from a laser diode modulation. At this angle of incidence, the reflection coefficient at the glass pane 1 amounts to approximately 4%. This amount causes only minor deviations with varying polarization directions.

The distal side 2 of the glass pane 1 to the laser diode L is made nonreflecting for light in the wavelength range of the main beam so that no additional reflections occur to cause undesirable interferences with the control beam KS. The signal beam NS can be fed into a fiber optic cable 3 for further transmission.

In the assembly shown in FIG. 2, the gain of the gain control device V2 is controlled through a microprocessor P. For that purpose, the error signal FS is applied to a rectifier 4 which, at its output port, supplies an input signal to a sample/hold device 5 and to a comparator 6. The other input signal for the comparator 6 is supplied by the sample/hold device 5, to whose output port the comparator is connected. The output of the comparator 6 is coupled to the microprocessor P, which controls the sample/hold device 5 and emits a control signal through a digital/analog converter 7 to the control input port S2 of the gain control device V2. A test signal applied to the input port E is used in the calibration adjustment of the gain control device V2.

During adjustment, the microprocessor P evaluates an error signal FS and effects a change in the gain of the gain control device V2 in sequential steps until the error signal FS lies within predetermined limits. The sample/hold device 5 holds the measured value of the error signal FS each time, and the comparator 6 compares two sequential measured values. In adjusting the gain of the gain control device V2, the microprocessor P commences with an initial value that is supplied to the control input port S2 through the analog/digital converter 7. Thereafter, the microprocessor P sets the sample/hold device 5 to "HOLD" so that the error signal FS obtained with the initial value is stored in the sample/hold device 5. A new gain value is then promulgated by the microprocessor P to the control input port S2; in response to the new gain value a new error signal FS results and is compared to the previous one in the comparator 6. The microprocessor P then changes the gain of the gain control device V2 so that the error signal FS is minimized. This process is repeated until a predetermined minimum is reached.

Upper and lower limits for the data word representing the gain adjustment can be entered into the microprocessor P. When either of these limits is exceeded, a display may be activated to so indicate. In this way, breakdowns or other impermissibly large errors can be detected and displayed.

FIG. 3 shows the principal design of a circuit for the amplifiers V1 and V2. This is a known circuit in which the two currents I1 and I2 are complementary to one another. The emitter current I3 determines the sum of the two currents I4 and I5, which are also complementary to one other:

$$I3 = I4 + I5.$$

The current source $I_E$ is almost equal to the sum of currents I1, I2 and I3:

$$I_E = I1 + I2 + I3.$$

With the correct selection of the operating points, a zero current I3 results in an almost linear relation between the current I2 flowing through the laser diode L and the input voltage $U_E$:

$$I2 = U_E/R_1.$$

With the aid of current I3, the conversion factor can be changed as follows:

$$I2 = (1/R_1)[(I_E - I3)/I_E]U_E.$$

The transistors T1 and T4 are interconnected at their bases, to which is applied a d.c. voltage $U_H$. An input at control input port S2 controls the gain of the gain control device V2 by controlling the current I3 flowing through transistor T7.

The adaptation of the conversion factor for high frequency operation is controlled by the microprocessor P in gross steps which, if necessary, may be refined. For example, an adaptation can be made shortly after the unit is turned on. A continuous adaptation of the conversion factor for high frequencies is not necessary, since aging in the laser diode L is very slow and the inherent changes of its parameters caused by aging negligible.

We claim:

1. A circuit for the conversion of an electrical input signal into an optical output signal comprising:
    a light-producing element;
    a controllable amplifier having said electrical input signal as a first input, said controllable amplifier being connected to said light producing element; and
    a feedback loop comprising:
    (a) a light-detecting element positioned to receive a portion of the optical output of said light producing element and thereby to provide an error signal in response to said portion;
    (b) an error amplifier connected to said light detecting element and having said error signal as an input; and
    (c) a control signal coupled to said controllable amplifier as a second input, said control signal being an output signal of said error amplifier in response to said error signal; and
    wherein said output portion of the optical output of said light-producing element is taken from a main beam.

2. The circuit as in claim 1 further comprising:
    a PIN diode as said light-detecting element;
    a d.c. voltage coupled to one side of said PIN diode;
    a delay line and an adjustable ohmic resistor in series connected at one end to the other side of said PIN diode, said delay line and adjustable ohmic resistor in series being connected at the other end to the input port of said circuit for receiving said electrical input signal.

3. The circuit as in claim 2 wherein:
    said controllable amplifier is a wideband, direct current amplifier having an inverted input port and a non-inverted input port to which said electrical input signal is applied to said inverted input port and said control signal is applied to said non-inverted input port; and
    said error amplifier is an operational amplifier having an adjustable constant direct current voltage for a reference voltage at one input port and said error signal at another input port.

4. The circuit as in claim 3 wherein said controllable amplifier comprises a gain control device having an adjustable gain at its output port.

5. The circuit as in claim 4 further comprising:
    a microprocessor having said error signal as an input and having a digital-to-analog converter at its output port for coupling to said gain-control device, said microprocessor controlling the gain of said gain-control device;
    a test signal for said electrical input signal applied to the input port of said circuit to provide a calibration signal for said error signal in response to said test signal;
    whereby said microprocessor controls said gain-control device in response to said calibration signal.

6. The circuit as in claim 5 further comprising:
    a rectifier having said error signal for an input;
    a sample/hold circuit coupled to said microprocessor for control and coupled to said rectifier for an input;
    a comparator circuit coupled to said sample/hold circuit for a first input and coupled to said rectifier for a second input, said comparator circuit providing said calibration signal for an output.

7. The circuit as in claim 6 further comprising:
    a substantial transparent element positioned proximately to said light producing element to reflect said portion of the output optical signal to said light detecting element.

8. The circuit as in claim 7 wherein said substantial transparent element is a glass pane and the angle of incidence of said main beam at said glass pane is less than 45 degrees.

9. The circuit as in claim 8 wherein the side of said glass pane proximal to said light producing element is angled opposite to the side distal to said light producing element.

10. The circuit as in claim 9 wherein said distal side does not reflect light.

11. The circuit as in claim 10 further comprising a polarization filter interposed between said light-producing element and said glass pane, said polarization filter having a polarization plane parallel to the direction of the main vibration of said light-producing element.

* * * * *